E. B. HUDSON.
PNEUMATIC WHEEL.
APPLICATION FILED OCT. 28, 1919.
1,344,401.
Patented June 22, 1920.
3 SHEETS—SHEET 1.
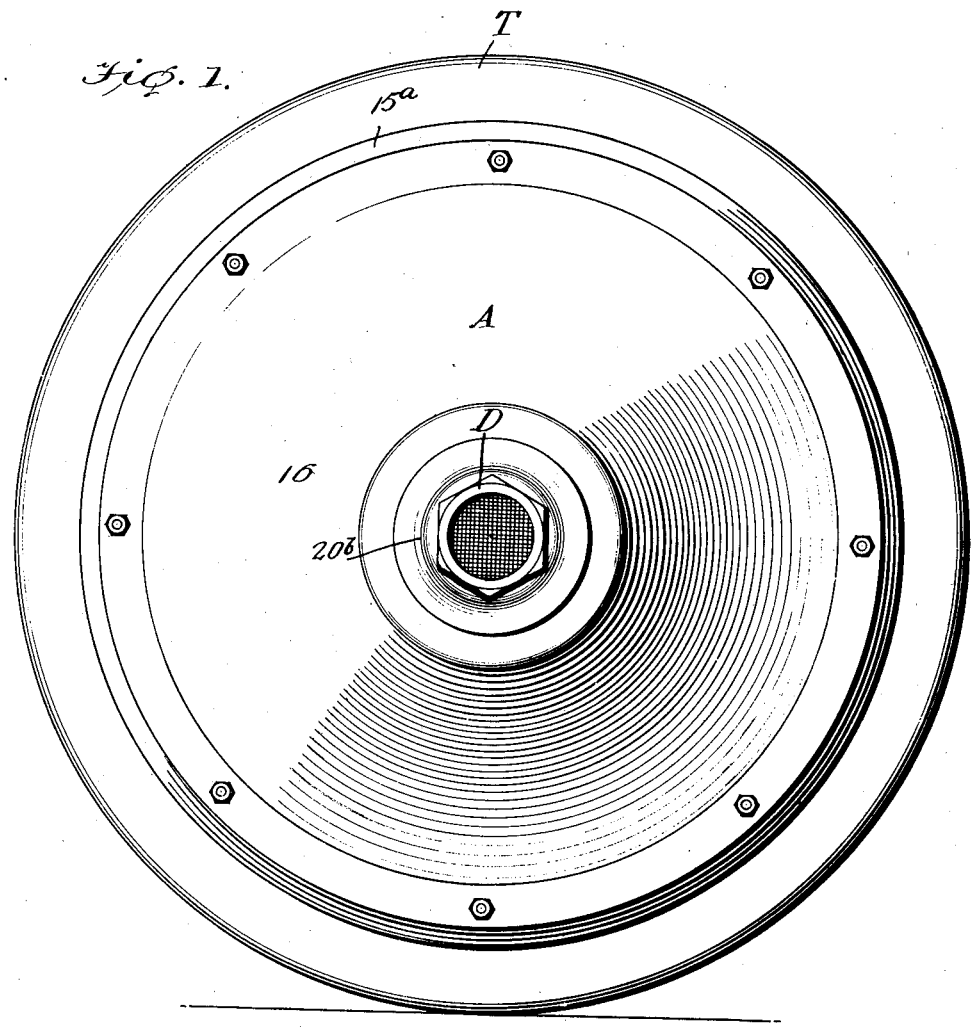
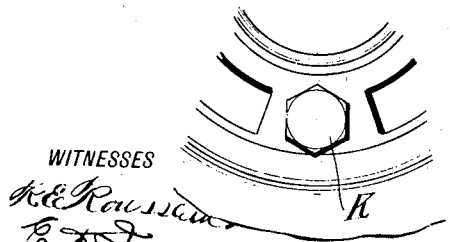
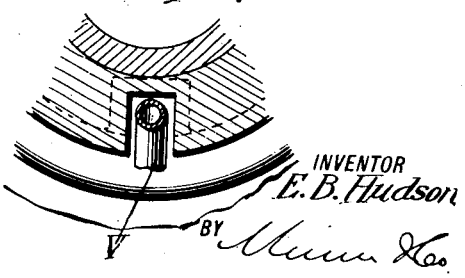
WITNESSES
INVENTOR
E. B. Hudson
BY
ATTORNEYS

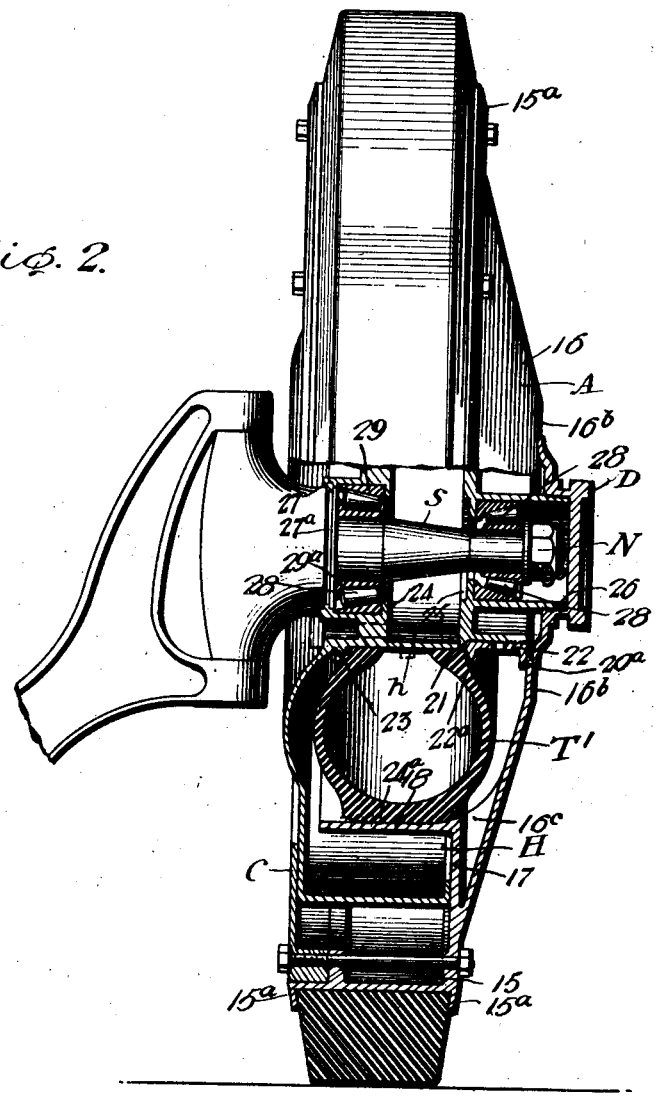
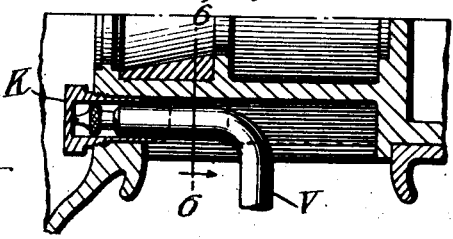

E. B. HUDSON.
PNEUMATIC WHEEL.
APPLICATION FILED OCT. 28, 1919.
1,344,401.
Patented June 22, 1920.
3 SHEETS—SHEET 3.
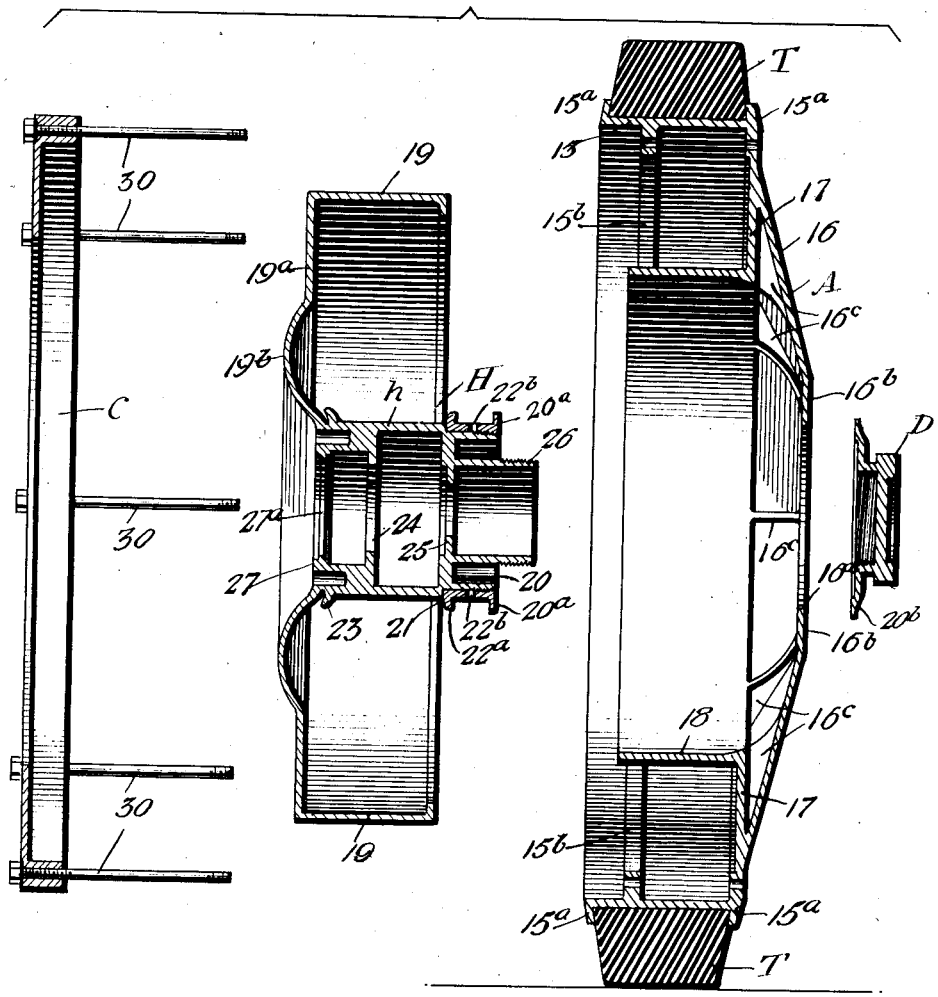
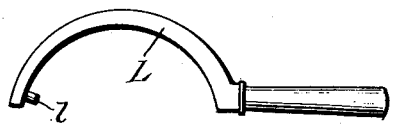
WITNESSES
INVENTOR
Edwin B. Hudson,
BY
ATTORNEYS

UNITED STATES PATENT OFFICE.

EDWIN BOOTH HUDSON, OF MIDDLETOWN, OHIO.

PNEUMATIC WHEEL.

1,344,401.   Specification of Letters Patent.   Patented June 22, 1920.

Application filed October 28, 1919. Serial No. 333,910.

*To all whom it may concern:*

Be it known that I, EDWIN B. HUDSON, a citizen of the United States, and a resident of Middletown, in the county of Butler and State of Ohio, have invented certain new and useful Improvements in Pneumatic Wheels, of which the following is a specification.

My invention relates to vehicle wheels, and particularly to wheels of the pneumatic type, a purpose of my invention being the provision of a wheel which presents the easy riding qualities of the present pneumatic tire, while at the same time eliminating punctures, blow-outs, and rim cuts.

I will describe one form of wheel embodying my invention, and will then point out the novel features thereof in the claims.

In the accompanying drawings:—

Figure 1 is a view, showing in side elevation one form of wheel embodying my invention;

Fig. 2 is a view, showing in edge elevation and partly in section the wheel shown in Fig. 1 in applied position upon the stub axle of a vehicle;

Fig. 3 are views showing in section the parts comprised in the wheel in the preceding views, such parts being disassembled;

Fig. 4 is a fragmentary sectional view, showing the manner in which the wheel is constructed to accommodate the valve stem of a pneumatic tire;

Fig. 5 is a fragmentary view, showing in side elevation the inside of the portion of the wheel shown in Fig. 4;

Fig. 6 is a sectional view, taken on the line 6—6 of Fig. 4; and

Fig. 7 is a view, showing in side elevation one form of tool adapted to be used in disassambling the wheel.

Similar reference characters refer to similar parts in each of the several views.

Referring specifically to the drawings, and particularly to Fig. 3, it will be seen that my invention essentially consists of four parts. A designates generally the main body of the wheel, and H a hub portion which is adapted to be housed within the body when a cover plate C is secured in position, as shown in Fig. 2. D designates a hub cap which is adapted to confine the hub portion H within the body A and to permit ready removal thereof when disassembling the wheel.

As shown in Figs. 2 and 3, the body A comprises a rim 15 formed on its edges with outwardly extending flanges $15^a$ which serve to secure a solid tire T thereupon. Formed integrally with the outer or right-hand edge of the rim 15 is a disk 16 which is of substantially convex formation and is formed centrally thereof with an opening $16^a$ to accommodate certain extensions formed on the hub portion H. Adjacent the opening $16^a$, the disk 16 is flattened, as at $16^b$, for a purpose which will hereinafter be described. The inner side of the disk 16 is formed at intervals with reinforcing ribs $16^c$ which are curved as shown. Extending inwardly from the inner side of the disk 16 is a flange 17, the inner edge of which latter is provided with an annulus 18 which is disposed concentrically of the rim 15.

The hub portion H comprises as shown in Fig. 3, a hub $h$ which is disposed concentrically within and formed integrally with an annular housing 19 including a wall $19^a$ which is curved outwardly as at $19^b$ and is connected to the rear end of the hub $h$ as shown. The hub $h$ is provided at its forward end with an extension 20 which is of a diameter less than that of the hub to provide a shoulder 21 at the juncture of the two. The extension 20 is threaded exteriorly to receive a collar 22, the inner edge of which latter is formed with an annular flange $22^a$ that coöperates with a similar flange 23 formed on the hub $h$ to provide securing means for a pneumatic tire T'. The manner in which these flanges $22^a$ and 23 maintain the pneumatic tire T is clearly shown in Fig. 2, wherein it will be seen that the tire encircles the hub $h$ and is provided with a thickened tread $24^a$. The hub $h$ is formed interiorly thereof with flanges 24 and 25, and extending forwardly from the flange 25 is a sleeve 26 which is threaded exteriorly to receive the hub cap D. Extending rearwardly from the flange 23 is a collar 27 which is formed interiorly with an annular rib $27^a$ that functions as a securing means for retaining a stub axle S within the hub. As shown in Fig. 2, the stub axle S is provided with an annular groove which receives the hub $27^a$ and thereby helps to lock the axle against longitudinal movement within the hub.

When the hub portion H is properly positioned within the body A of the wheel, as shown in Fig. 2, the housing 19 is interposed between the rim 15 and the annulus 18, the inner edge of the housing bearing against the inner side of the disk 16. In this position of the hub portion H, the sleeve 26 projects through the opening 16$^a$ of the disk 16 a distance sufficient to allow the application of the hub cap D. In the applied position of the hub cap D it will be noted that its inner end is disposed in spaced relation to the extension 20 and the collar 22, the confronting ends of the collar and cap being formed with annular flanges 20$^a$ and 20$^b$ between which is slidably received the flattened portion 16$^b$ of the disk 16. This arrangement permits the body A of the wheel to move diametrically or vertically when the wheel is mounted upon the stub axle S, this movement being limited to sufficiently allow the proper compression of the tire T' in absorbing shocks.

Before the hub portion H is seated within the body A, the pneumatic tire T' is arranged about the hub $h$ and between the flanges 22$^a$ and 23 by first removing the collar 22 through the manipulation of the tool L, Fig. 7, which is formed with a lug $l$ that seats in one of a pair of openings 22$^b$ formed on the collar. In this position, the tread surface 24 of the tire rests upon the inner face of the annulus 18, it being noted that a portion of such face is slightly curved to conform to the contour of the tire. With the tire T' embracing the hub $h$ the curved portion 19$^b$ of the housing is disposed to permit lateral expansion of the tire under the vertical movement of the wheel, the reinforcing ribs 16$^a$ being curved as previously described to also permit this movement so that the pneumatic tire is free to move in absorbing the shocks to which the wheel may be subjected. The tire T' is inflated through a valve stem V which, as shown in Figs. 4 and 6 is bent at right angles with its free end disposed in an opening formed in the hub portion H in such manner as to permit an air pump to be applied thereto. The outer end of the stem is normally housed within a cap K which is removably fitted within the wheel, as shown.

In the applied position of the wheel to the stub axle S as shown in Fig. 2, the latter extends through the hub $h$ and into the sleeve 26, the wheel being rotatably supported upon the stub axle by roller bearings 28 which are interposed between bearing races 29 and 29$^a$. The races 29 abut the flanges 24 and 25 while the races 29$^a$ embrace the stub axle and are formed with flanges which serve to confine the bearings 28 in proper position between the two races. The stub axle S is locked within the hub portion by means of a nut N.

After the stub axle S has been properly positioned within the hub portion H of the wheel, the cover plate C is now applied to the wheel, the same being of a diameter to snugly fit within the rim 15 so as to abut a rib 15$^b$ formed interiorly of the latter. The cover plate C is secured to the rim by means of bolts 30 which extend through the rib 15$^b$ and the disk 16, as clearly shown in Fig. 2.

Now that the wheel is assembled upon the stub axle, it will be clear that the pneumatic tire T' is not exposed to the surface over which the wheel is traveling but is completely housed against the detrimental action of the elements, punctures and blowouts to which the usual pneumatic tire is subjected. It will be also clear that I have provided a wheel of comparatively few parts which are associated in a manner to permit the ready disassembling of the wheel.

Although I have herein shown and described only one form of wheel it will be understood that various changes and modifications may be resorted to without departing from the spirit of the invention or the spirit and scope of the appended claims.

Having thus described my invention, I claim:

1. A wheel comprising a rim adapted to receive a solid tire, a disk formed on one edge of the rim, an annulus formed on said disk and disposed within said rim, a hub arranged concentrically within said annulus and extending through said disk, a housing carried by said hub and disposed between said annulus and said rim, and a cushioning member surrounding said hub and bearing upon said annulus.

2. A wheel comprising a rim, a tire supported on the rim, a convex disk formed on one edge of said rim, an annulus formed on said disk and disposed within said rim, a housing interposed between said rim and annulus and spanning the latter, a hub extending through said annulus and disk and slidably associated with the latter, a pneumatic tube interposed between said hub and annulus, and a cover plate removably associated with said rim and spanning the space between said housing and rim.

3. A wheel comprising a disk having an axial opening formed therein, a hub extending through said opening, annular flanges removably associated with said hub and spaced apart to slidably receive said disk, a rim formed on said disk, and cushioning means interposed between said hub and rim.

4. A wheel comprising, a rim adapted to receive a solid tire, a rib formed internally of the rim, a disk formed on the outer edge of the rim and including a straight portion and a convex portion, an annulus secured to the straight portion, a hub arranged concentrically within said annulus and extending through the convex portion of said disk, a hub portion including a hub, a sleeve formed on one end of the hub, an extension formed on the same end of the hub and surrounding said sleeve, a collar threadedly engaging said extension, a hub cap on said sleeve, flanges formed on said collar and said cap for slidably receiving the inner edge of said disk therebetween, gripping flanges formed on said hub and said collar for confining a tube on said hub, a housing formed integral with the opposite end of said hub, a pneumatic tube between said hub and said annulus and engaged by said gripping flanges, a cover plate spanning said wheel at the side opposite from the side of said disk, and means extending through said rib and said disk for securing said coverplate to the wheel.

5. A wheel comprising, a rim, a disk formed on one edge of the rim and including a straight portion and a convex portion formed centrally with an opening, an annulus formed on the straight portion, a hub portion including a hub extending through the convex portion of said disk, gripping flanges formed on said hub, a housing formed on one end of said hub and having a cover portion disposed between said rim and said annulus and bearing against said disk, a cushioning member interposed between the annulus and the hub and engaged by said gripping flanges, a hub cap for locking the hub against displacement from the wheel in one direction, and a cover plate secured to said disk and confining the hub portion against displacement in the other direction.

EDWIN BOOTH HUDSON.

Witness:
J. V. BONNELL.